Patented Mar. 15, 1927.

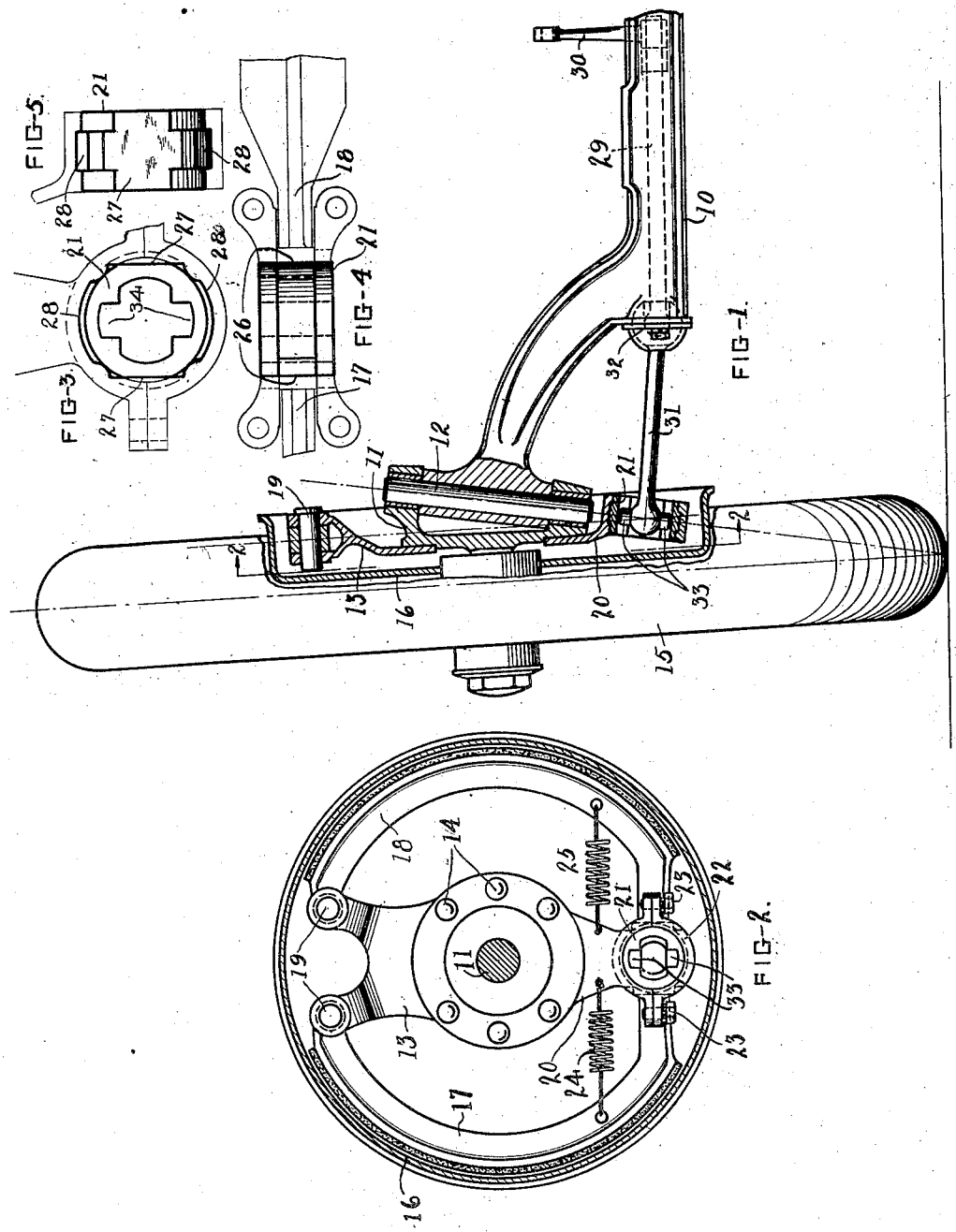

1,620,752

UNITED STATES PATENT OFFICE.

PAUL BASTIEN, OF CLEVELAND, OHIO.

BRAKE.

Application filed October 4, 1923. Serial No. 666,513.

This invention relates to brakes for steering wheels of motor vehicles and has for one of its objects the provision of a comparatively simple brake mechanism that will be applicable to steering wheels, generally, irrespective of the angle between the plane of the wheel and the steering pivot and the position of the actuating shaft for the brake, that is, whether in line with the steering pivot or to the front or rear thereof.

Another object of the invention is to provide a brake mechanism of the type specified, that will not, in its operation, affect the steering movements or be affected by them.

Other objects and the features of novelty will be apparent from the following description taken in connection with the accompanying drawing, of which:

Figure 1 is an elevation of an axle having a steering wheel at the end thereof, with certain parts being shown in section, the construction embodying my invention;

Fig. 2 is a substantially vertical section on the line 2—2 of Fig. 1;

Fig. 3 is a side elevation of the actuating cam for the brake, the support for the cam being shown in outline;

Fig. 4 is a plan view of the cam shown in Fig. 3 with the support therefor and the brake shown in outline.

Fig. 5 is an elevation of the cam shown in Fig. 3 with the bearing therefor shown in outline.

Referring to the drawings, 10 indicates an axle having steering spindle members connected to its ends, one of such members being indicated at 11 and connected with the end of the axle by the pivot 12. A brake spider 13 is secured to the member 11 in any preferred manner as by means of rivets 14. A steering wheel 15 is rotatably mounted on the member 11 and carries the brake drum 16, the drum being secured to the wheel according to any of the well known methods.

Brake shoes 17 and 18 are connected at one end with the spider 13 by pivots 19. A depending bracket 20 on the brake spider has its lower end formed as a half-bearing for the rotatable cam 21, the cam being secured in position on the bracket 20 by means of the cap 22 which is secured by bolts 23 or in any other suitable manner. Springs 24 and 25 are respectively connected with the shoes 17 and 18 and, at their inner ends, with the bracket 20 and normally tend to withdraw the shoes from engagement with the interior of the brake drum 16. The ends of the shoes 17 and 18 are formed with substantially parallel flat faces 26 which engage the flattened sides 27 of the cam member 21.

The cam member 21 is provided with a substantially cylindrical outer surface to fit the bearing therefor in the bracket 20 and on the upper and lower sides of the cam there are ribs 28 fitting in complementary grooves in the bearing to hold the cam member against axial displacement.

An actuating shaft 29 is supported on the axle 10, suitable bearings being provided therefor, and this shaft carries an actuating arm 30 which is connected with a brake lever (not shown), on the body of the vehicle. The shaft 29 may be on either side of the axle 10 and is connected with an extension shaft 31 by any suitable form of universal joint housed in the bearing 32.

In the form of the invention illustrated in the drawings the plane of the wheel 15 is inclined with respect to the plane of the pivot 12 and the center of the cam member 21 is located at the intersection of these planes, as clearly shown in Fig. 2. The plane in which the cam 21 rotates is preferably in alignment with the axis of the pivot 21 so that the relation between the cam member 21 and the pivot 12 is not disturbed by the steering movements of the wheel.

The shaft 31 projects into the cam member 21 and has a pair of trunnions 33 which engage with the grooves 34 on opposite sides of the cam member so as to form a universal joint connection therewith.

In the operation of the brake the rotation of the shaft 31 effects the rotation of the cam 21 and the latter spreads the shoes 17 and 18. When the brake is set the wheel is not restrained, as to its steering movements, because the trunnions 33 form a universal joint connection with the cam 21 and the universal joint connection between the shaft 31 and the shaft 29 permits the shaft 31 to assume any required position in the operation of the brake. On the other hand, when the wheel 15 is turned, as in steering, the cam 21 oscillates about the trunnions 33 and, therefore, when the shaft 31 is turned the cam 21 turns with it to spread the brake shoes.

The construction described has the advantage of simplicity and having the shaft 31 arranged below the pivot 12 where it is out of the way and inconspicuous.

Having thus described my invention, what I claim is:

1. In brake mechanism, the combination of an axle, a steering wheel spindle member pivoted thereto, a wheel on said spindle member, a brake drum carried by said wheel, a brake cooperating with said drum and having opposed ends adapted to be separated to apply the brake to said drum, the plane of said brake being at an angle to the plane of said pivot, a cam member carried in an enclosing bearing on said spindle member below said pivot and rotatable about an axis that intersects and is normal to the axis of said pivot, said cam operatively engaging said opposed ends of said brake, an actuating shaft projecting into said cam member and with its axis substantially coincident with the axis of said cam and having one end supported on said axle, and a universal joint connection between said shaft and the interior of said cam member.

2. In brake mechanism, the combination of an axle, a steering wheel spindle member pivoted thereto, a wheel on said spindle member, a brake drum carried by said wheel, a brake cooperating with said drum and having opposed ends adapted to be separated to apply the brake to said drum, the plane of said brake being at an angle to the plane of said pivot, a cam member having an external bearing surface whereon it is rotatable about an axis that intersects and is normal to the axis of said pivot and below the latter, said cam member having an opening therein and grooves on opposite sides of said opening, and a shaft projecting into said cam member with its axis substantially coincident with the axis of said cam member and having trunnions engaging with said grooves to provide a universal joint connection between the shaft and cam member.

In testimony whereof I affix my signature.

PAUL BASTIEN.